United States Patent [19]

Zengel et al.

[11] 4,301,257

[45] Nov. 17, 1981

[54] POLYFUNCTIONAL ISOCYANATES FREE OF ALKALI AND UREA GROUPS

[75] Inventors: Hans Zengel, Kleinwallstadt; Rainer Zielke; Manfred Bergfeld, both of Erlenbach, all of Fed. Rep. of Germany

[73] Assignee: Akzona Incorporated, Asheville, N.C.

[21] Appl. No.: 129,878

[22] Filed: Mar. 13, 1980

Related U.S. Application Data

[63] Continuation-in-part of Ser. No. 40,374, May 18, 1979, abandoned.

[51] Int. Cl.[3] .......................... C08F 8/00; C08F 8/22; C08F 8/30; C08F 18/72
[52] U.S. Cl. .............................. 525/329; 260/453 P; 525/336; 525/358; 526/307.7; 526/307.8; 528/44; 528/75
[58] Field of Search .................. 260/453 P; 525/329, 525/333, 334, 336; 528/44, 75; 526/303

[56] References Cited

U.S. PATENT DOCUMENTS 3,483,242 12/1969 Brownstein et al. ............ 260/453 P
3,929,744 12/1975 Wright et al. ...................... 528/336

OTHER PUBLICATIONS

Wright et al., *Journal of Applied Polymer Science*, vol. 20, pp. 3305-3311 (1976).

*Primary Examiner*—Dolph H. Torrence
*Attorney, Agent, or Firm*—Jones, Tullar & Cooper

[57] ABSTRACT

This invention relates to a polyfunctional isocyanate which is an acrylamide or methacrylamide homopolymer or interpolymer having 20 to 100% of its secondary α and tertiary α carbon atom amide groups converted to isocyanate groups, said polyfunctional isocyanate being free of alkali and urea groups.

The polyfunctional isocyanates are prepared by reacting the N-chloramide derivative of the acrylamide or methacrylamide polymer, in an inert solvent, with a tertiary amine having a $pK_a$ value of more than 7.

The polyfunctional isocyanates are useful for forming coating compositions.

15 Claims, 2 Drawing Figures

POLYFUNCTIONAL ISOCYANATES FREE OF ALKALI AND UREA GROUPS

CROSS REFERENCE TO RELATED APPLICATIONS

This application is a continuation-in-part of application Ser. No. 40,374, filed May 18, 1979, abandoned.

BACKGROUND OF THE INVENTION

Figure 1:
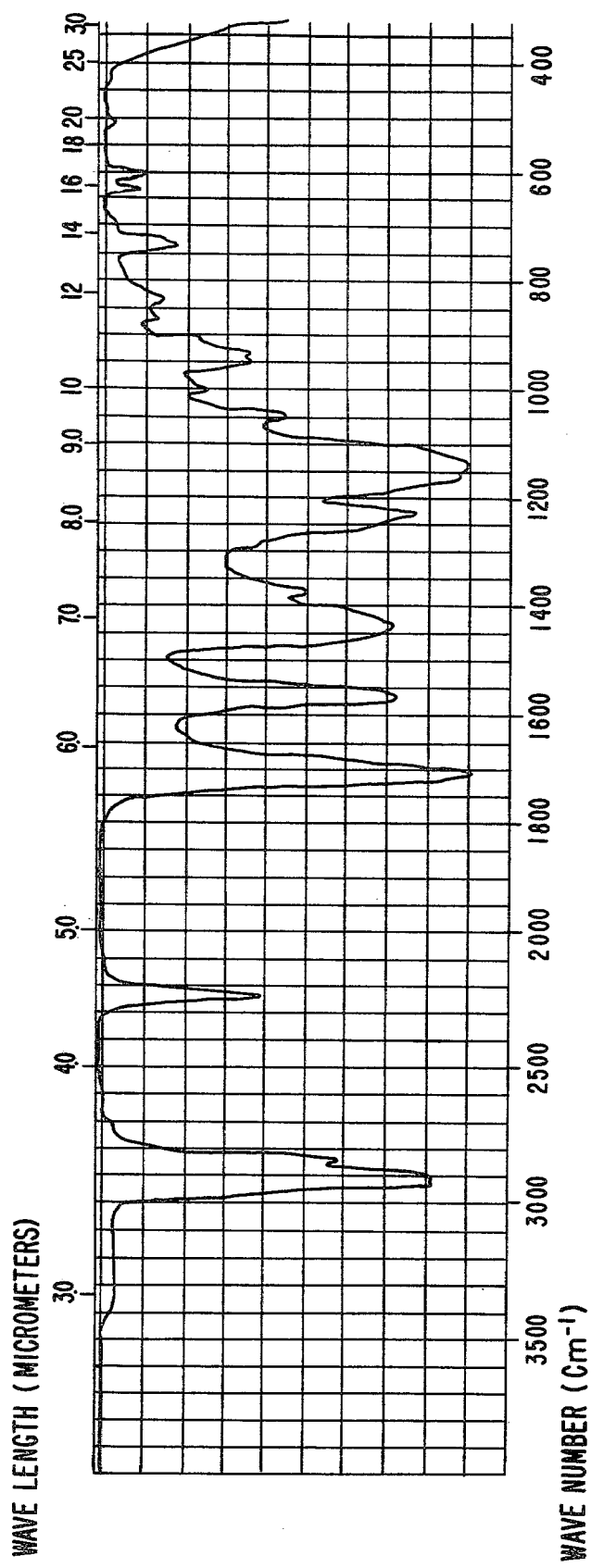
FIG. 1 is the IR spectrum of a polyisocyanate prepared by Example 20 of U.S. Pat. No. 3,929,744.

U.S. Pat. No. 3,929,744, and Wright et al, *Journal of Applied Polymer Science*, 20:3305-3311 (1976), teach that polymers containing amide groups can be reacted with excess aqueous alkali hypochlorite, in the presence of an inert solvent, at temperatures in the range of 0° to 15° C., to form isocyanates. The amide group containing polymers used in this reaction are sterically hindered polyamides, namely secondary α-carbon or tertiary α-carbon amide polymers, such as interpolymers of acrylamide or methacrylamide with vinyl monomers free of hydroxyl or carboxyl groups; or the amide homopolymers.

In the prior art processes, a portion of the amide groups in the starting polymer is converted to isocyanates by the Hofmann degradation reaction, which results in amide groups and isocyanate groups apparently statistically distributed along the polymer chain.

The resultant isocyanate group containing polymers can be used to prepare coating compostions curable at low temperatures. However, this use requires polymers of high purity, i.e. polymers which except for unchanged amide groups and the isocyanate groups, contain, if possible, no additional functional groups. In addition, the polyfunctional isocyanates should have an isocyanate content as high as possible. The prior art polyfunctional isocyanates do not meet these demands. Because they are prepared by a Hofmann degradation reaction, i.e. in an aqueous alkali medium, it is unavoidable that a portion of the isocyanate groups formed are hydrolytically decomposed during processing of the reaction mixture. Amino groups, formed from the unstable carbamic acid, react with isocyanate groups to form ureas. Consequently, in addition to unchanged amide groups and the desired isocyanate groups, the prior art products also contain undesirable urea groups. In this connection, reference is made to the IR spectrum shown on Page 3307 of the publication of Wright et al supra, which shows a strong urea band at about 1550 cm$^{-1}$. In addition, the prior art polymers also contain free alkali, in quantities found to be harmful in the further processing of the products. An additional, important disadvantage of the known products is their comparatively low isocyanate group content, which is a result of the above-described side reactions. Thus, e.g. according to Example 15 of U.S. Pat. No. 3,929,744, there is at first 5.2% by weight of isocyanate groups present when a polymer containing amide groups is reacted with sodium hypochlorite, but only 3.25% by weight of isocyanate groups can be detected after the isocyanate has been isolated by the removal of water. Not only the prior art products, but the prior art process has disadvantages: In the prior art process, the reaction takes place in a mixture of an organic solvent and water. An emulsion results, which cannot be completely separated into the aqueous and the isocyanate-containing organic phase, even with the addition of deemulsifiers. Thus, part of the desired reaction product is lost in the aqueous phase. Another disadvantage of this process is the long separation times, i.e. at least several hours, or sometimes several days.

DESCRIPTION OF THE INVENTION

An object of this invention is to provide polyfunctional derivatives of homopolymers or interpolymers of acrylamide or methacrylamide, that are free of alkali and urea groups. The interpolymers are interpolymers of acrylamide or methacrylamide with each other and/or with vinyl monomers free of hydroxyl or carboxyl groups, preferably styrene, methylstyrene, dimethylstyrene, chlorostyrene, and/or an alkyl acrylate, preferably having 1-15 carbon atoms, such as methyl acrylate, methyl methacrylate, butyl acrylate, butyl methacrylate, decyl acrylate, decyl methacrylate, dodecyl methacrylate, or dodecyl methacrylate. The invention also encompasses crosslinked polyfunctional isocyanates wherein the acrylamide or methacrylamide polymers are crosslinked with polyvinyl monomers such as divinyl benzene or divinyl ethers.

The polyfunctional isocyanates of the invention are formed from N-chloramide derivatives of the acrylamide or methacrylamide homopolymers or interpolymers. The N-chloramides are prepared by chlorination of the appropriate amide group containing polymer with chlorine.

While N-chloramides are mentioned in U.S. Pat. No. 3,929,744 as intermediate compounds, and it is even conjectured there that the N-chloramides could be separated from the intermediary sodium salt by acidification of the reaction mixture with a mineral acid, actually the isocyanate is formed. Because of the difference between the prior art synthesis and the synthesis of the invention, the polyfunctional isocyanates of the invention have a chemical structure fundamentally different from the prior art products. The products of the invention have no urea groups, are free of alkalis and have an isocyanate group content signficantly higher than that of the prior art products. In the products of the invention, about 20% to 100% of the amide groups in the starting polymer have been converted to isocyanate groups. The different chemical nature of the polyfunctional isocyanates pursuant to the invention becomes apparent from a comparison of the IR spectra shown in FIGS. 1 and 2.

Figure 2:
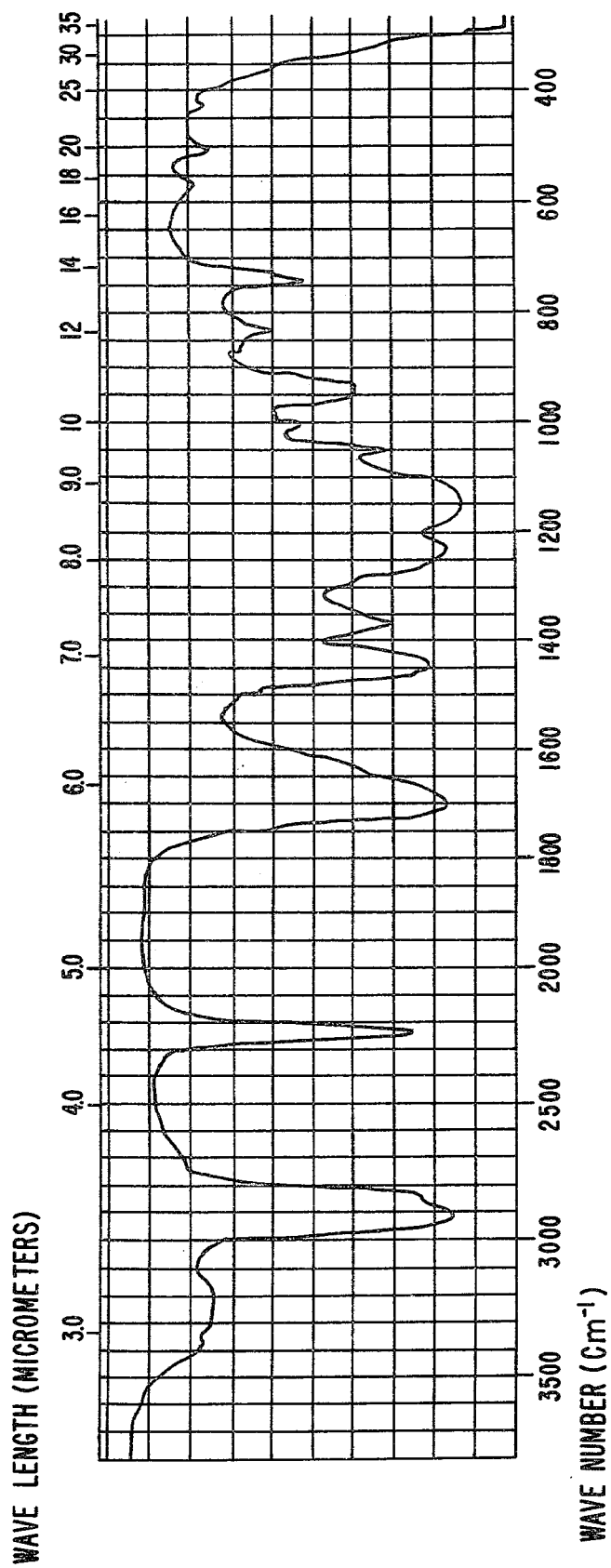
FIG. 2 is the IR spectrum of a polyisocyanate prepared from the same amide polymer as employed above by the process of the invention.

FIG. 1 shows the IR spectrum of a polyisocyanate synethesized pursuant to Example 20 of U.S. Pat. No. 3,929,744, prepared by Hofmann degradiation of a copolymer of 15% methacrylamide and 85% butyl methacrylate with an isocyanate content of 2.6%. FIG. 2 shows the IR spectrum of a product pursuant to the invention obtained from the same polymer containing amide groups, but via the N-chloramide stage, with an isocyanate content of 3.5%. In contrast to the IR spectrum of the product pursuant to the invention, the IR spectrum of the product pursuant to U.S. Pat. No. 3,929,744 has a strong urea band at about 1550 cm$^{-1}$, the intensity of which can be compared with that of the isocyanate band. In the IR spectrum of a polyisocyanate derived from a copolymer of 30% methacrylamide and 70% butyl acrylate, which is shown on Page 3307 of the *Journal of Applied Polymer Science*, 20, one can also recognize an intensive urea band at about 1550 cm$^{-1}$.

In the process of the invention, polyfunctional isocyanate derivatives of the homo- or interpolymers of acrylamide or methacrylamide are prepared by reacting an appropriate N-chloramide derivative of the homo- or inter- polymer with a tertiary amine having a p$K_a$ value of more than 7, in the presence of an inert solvent, at temperatures from about 20° to 180° C. Preferably, the N-chloramide derivative is the N-chloramide of an interpolymer of methacrylamide and acrylamide or of methacrylamide or acrylamide with vinyl monomers free of hydroxyl or carboxyl groups, preferably styrene, methylstyrene, dimethylstyrene, chlorostyrene, and/or an alkyl acrylate, preferably having 1-15 carbon atoms, such as methyl acrylate, methyl methacrylate, ethyl acrylate, ethyl methacrylate, butyl acrylate, butyl methacrylate, hexyl acrylate, hexyl methacrylate, decyl acrylate, decyl methacrylate, dodecyl methacrylate, or dodecylmethacrylate. Where crosslinked polyisocyanates are prepared using a polyvinyl crosslinking monomer, the preferred N-chloramide is a N-chloramide polymer crosslinked with divinyl benzene or divinyl ether.

The appropriate polymers containing amide groups, which are required for the preparation of the N-chloramide derivatives, have in part already been described in U.S. Pat. No. 3,929,744, (which is hereby incorporated by reference) and include polyacrylamide, polymethacrylamide, interpolymers of methacrylamide or acrylamide and styrene, methylstyrene, dimethylstyrene, chlorostyrene and alkyl acrylates, such as methyl acrylate, methyl methacrylate, ethyl acrylate, ethyl methacrylate, butyl acrylate, hexyl acrylate, decyl acrylate and dodecyl acrylate, as well as the products of the mentioned polymers and copolymers, crosslinked by means of customary crosslinking agents, such as divinyl benzene and divinyl ether. The homo- and interpolymers useful herein contain 5 to 100 mol % acrylamide or methacrylamide.

The molecular weight distribution of the homo- and interpolymers covers a wide range. Typically, the average molecular weight may vary from 1000 to 10,000, but, preferably, use is made of polymers with an average molecular weight from 5000 to 10,000. The crosslinked initial polymers, for example, can be crosslinked with 1 to 10 mol % of a divinyl compound.

Chlorination of the amide group containing homo- and interpolymers is preferably carried out with chlorine in an aqueous-mineral acid suspension at temperatures from about 0° to 40° C. Suitable aqueous mineral acids are e.g. dilute, aqueous hydrochloric acid, sulfuric acid and phosphoric acid. Preferably, a start is made with dilute hydrochloric acid or dilute sulfuric acid aqueous suspensions of the amide group containing polymers. Chlorination proceeds exothermally and is preferably carried out at temperatures from about 0° to about 30° C. The use of temperatures higher than about 40° C. is disadvantageous, because noticeable quantities of carboxyl groups are formed by hydrolysis. Chlorination can be carried out at ambient or at elevated pressures. The required reaction time decreases with increasing pressure, but, for reasons of economy, the preferred pressure range is between about 1 and about 6 atmospheres gage pressure. Since chlorination is taking place in a heterogeneous phase, care must be taken, that the suspension is properly mixed. The reaction mixture should be diluted, at least to such an extent, so that it can be stirred, or mixed in some other way, without any difficulties. The preferred dilution of the reaction batch is about 100 to 200 grams of amide group containing polymer per liter of water, or aqueous mineral acid. When the above processing conditions are maintained, chlorination is completed in about ¼ to 2 hours. Depending upon the composition of the amide group containing polymers, about 20 to 100% of the amide groups are transformed into N-chloramide groups under these conditions. The only solid substance present in the suspension, after chlorination is completed, is the modified polymer, which can be separated from suspension by conventional means, for example, by filtering or centrifuging.

The selection of a suitable base is of a decisive factor for the success of the process step pursuant to the invention wherein the N-chloramide is converted to the isocyanate. Tertiary amines of a certain basicity are used. The basicity constant p$K_a$ is employed as a measure of the basicity. Tertiary amines suitable for the process pursuant to the invention should have a minimum basicity corresponding to a p$K_a$ value of more than 7. Suitable tertiary amines are aliphatic, cycloaliphatic and aromatic amines such as (the pertinent p$K_a$ values, in each case at 20° C., are given in parentheses) trimethylamine (9.90), triethylamine (10.74), tri-n-butylamine (9.89), 2.4.6-trimethylpyridine (7.45–7.63), tri-n-propylamine (10.74), ethyldimethylamine (10.06), propyldimethylamine (10.16), isopropyldimethylamine (10.38), methyldimethylamine (10.43), butyldimethylamine (10.31), 2.3.4.5-tetramethylpyridine (7.78) and 2.3.4.5.6-pentamethylpyridine (8.75). Preferred tertiary amines are trimethylamine, triethylamine, tri-n-propylamine and tri-n-butylamine. The p$K_a$ values can be found in customary handbooks. In the case of aliphatic, tertiary amines, special reference is made to L. Spialter et al., *The Acyclic*, Aliphatic Tertiary Amines, The McMillan Co., New York (1965) and, in the case of substituted pyridines, to Klingsberg, *Heterocyclic Compounds Pyridine and Derivatives* part 2, Interscience Publishers, Inc., New York (1961).

The basicity of the tertiary amine employed is significant for the progress of the reaction, i.e. when polymers with the same N-chloramide content are used, the isocyanate yield is lower, the lower the p$K_a$ value of the tertiary amine.

The tertiary amine is employed in quantities of at least about one molar equivalent per mole of N-chloramide constituent in the polymer. The preferred equivalence ratio of N-chloramide to tertiary amine is about 1:1 to about 1:4. Larger quantities of tertiary amines can be used without being harmful, but should be avoided for reasons of economy.

The N-chloramide conversion step is conducted in the presence of an organic solvent. In the selection of the organic solvent, care must be taken that, under the conditions of the reaction, the solvent is inert, i.e. that it will react neither with the N-chloramide group, nor with the isocyanate group, nor with the tertiary amine being used. Suitable solvents include, for example, methylene chloride, 1,1-dichloroethylene, chloroform, carbon tetrachloride, trichloroethylene, tetrachloroethylene, pentane, hexane, cyclohexane, heptane, octane, benzene, toluene, ethyl benzene, chlorobenzene, xylene, dichlorobenzene, diethyl ether, tetrahydrofuran, dioxane, methyl acetate, butyl acetate, and methyl propionate. The preferred solvents are toluene, xylene, chlorobenzene, tetrachloroethylene, carbon tetrachloride, cyclohexane, dioxane, chloroform and butyl acetate.

The preferred dilution of the reaction batches is about 100 to 200 grams of N-chloramide-containing polymer per liter of solvent, but lower, or higher concentrations can also be used.

In the process of the invention, the reaction temperatures for the N-chloramide conversion step are in the range from about 20° to about 180° C. Essentially, the optimum temperature depends upon the specific polymer used, its N-chloramide content, and the basicity of the tertiary amine. In the case of some starting materials, the reaction will start at room temperature and at least in part even very vigorously. As a rule, the reaction is carried out at the boiling temperature of the solvent used. The preferred reaction temperatures are in the range from about 65° to about 135° C.

In the N-chloramide conversion process of the invention, the required reaction times are brief, as a rule only a few minutes. However, long reaction times, e.g. a reaction time of one hour, can be used without being harmful.

In conducting the N-chloramide conversion of the invention it is expedient to disperse the N-chloramide-containing polymer in the solvent and then to add the required minimum quantity of tertiary amine. In some cases, the reaction starts immediately, in other cases, the temperature is quickly raised to the desired reaction temperature. As a rule, the boiling temperature of the solvent is used. If required, heating is continued for a longer period of time with reflux and, after the reaction has taken place and the reaction mixture has cooled, the resultant tertiary amine hydrochloride is separated, for example by filtration and the product isolated, e.g. by concentration, the filtrate in a vacuum.

The resultant polyfunctional isocyanate derivatives of the acrylamide or methacrylamide homo- or interpolymers, free of alkali and urea groups can be used to form film forming compositions such as films and coatings, in particular, lacquers. Film forming compositions and the resultant films can be obtained by admixing and reacting the polyisocyanate with conventional isocyanate group reactive active hydrogen containing reactants such as, for example, amines, acids, and alcohols.

U.S. Pat. No. 3,929,744 and Wright et al., supra describe coating composition that can be baked, or cured, at low temperatures. However, these prior art compositions are inferior in quality as compared to the comparable polymer composition derived employing the polyisocyanates of the invention. For example, when the prior art polymeric isocyanates are reacted, i.e. cross-linked with polyols, one generally obtains turbid, to slightly turbid products of comparatively low hardness. The turbidity is probably due to the urea groups of the polyisocyanate. In contrast, the polyisocyanates of the invention are clear and, when crosslinked with polyols, also result in clear products of high hardness. Consequently, the polyisocyanates of the invention are excellently suited for the preparation of coating compositions, particularly those formed by admixing polyols.

There follows a number of Examples which are to be considered illustrative rather than limiting. All parts and percentages are by weight unless otherwise specified. All temperatures are degrees centrigrade unless otherwise specified.

A. PREPARATION OF THE POLYMERIC N-CHLORAMIDE

Procedure A 10 g of an interpolymer of 10 parts methacrylamide, 50 parts methyl methacrylate and 40 parts butyl acrylate were dispersed in 100 g of 5% hydrochloric acid. After that, chlorine was passed through for 4 hours at 15° to 20° C. After stripping of the excess chlorine with nitrogen, the polymeric N-chloramide was filtered off with suction, washed until neutral with distilled water and dried at 35° C. in a vacuum (30 Mbar).

Procedure B 10 g of an interpolymer of 20 parts methacrylamide, 40 parts methacrylate and 40 parts butyl acrylate were chlorinated for 30 minutes at 20° C. with a chlorine pressure of 4 bar in 100 g of 5% hydrochloric acid. The N-chloramide was isolated as indicated under Procedure A. 10.35 g of polymeric N-chloramide with an active chlorine content of 6.4% were obtained, i.e. 83% of the amide groups were chlorinated.

B. PREPARATION OF THE POLYMERIC ISOCYANATE

Example 1

10 g of polymeric N-halogen amide, prepared by chlorinating an interpolymer of 10 parts methacrylamide, 50 parts methyl methacrylate and 40 parts butyl acrylate, with an active chlorine content of 3.1%, were suspended in 100 ml of toluene. After the addition of 3 g of triethylamine, the mixture was quickly heated to 100° C. and left at this temperature for 30 minutes. After that, excess triethyl amine and 20 ml of toluene were distilled off. After cooling, the precipitated triethylamine hydrochloride and other undissolved constituents were separated and the filtrate concentrated in a vacuum. 9.5 g of resin free from alkali and urea groups, with an isocyanate content of 3.4% remained.

Example 2

The reaction was carried out analogous to Example 1, except that, instead of the toluene, the same quantities of chlorobenzene, dioxane and acetic butyl ester were used in each case. Table 1 shows the quantities of polymeric isocyanate free from alkali and urea groups that were isolated, together with their NCO contents.

TABLE 1

| Reaction Medium | Quantity by weight of polymeric isocyanate | NCO content (%) |
|---|---|---|
| chlorobenzene | 9.3 g | 3.35 |
| dioxane | 9.5 g | 3.2 |
| acetic butyl ester | 9.25 g | 3.5 |

Example 3

10 g polymeric N-halogen amide, prepared by chlorinating an interpolymer of 20 parts methacrylamide, 40 parts methylmethacrylate and 40 parts butyl acrylate, with an active chlorine content of 6.4%, were, as in Example 1, suspended in toluene and converted to the polymeric isocyanate with an addition of 5 g of triethylamine. 9.25 g of a resin free from alkali and urea groups, with an NCO content of 4.7%, were obtained.

Example 4

Additional polymeric N-chloramides were, as described in the above examples, suspended in toluene and converted to the polymeric isocyanates with triethyl amine.

Table 2 shows the composition of the polymers, the chlorine content of the polymeric N-halogen amides, as well as the NCO content of the polymeric isocyanates free from alkali and urea groups, that resulted therefrom.

TABLE 2

| Polymer composition | Chlorine content % | Converted quantity of N-chloramide g | Triethylamine g | Weighed quantity % | NCO content % |
|---|---|---|---|---|---|
| 10% methacrylamide 90% decyl acrylate | 3 | 10 | 2 | 9.6 | 3.2 |
| 30% methacrylamide 30% methylmethacrylate 40% butyl acrylate | 10.1 | 10 | 10 | 8.8 | 5.5 |
| 30% methacrylamide 70% butyl acrylate | 11.2 | 10 | 10 | 8.6 | 5.6 |

Example 5

As in Example 1, 10 g of polymeric N-halogen amide, prepared by chlorinating an interpolymer of 20 parts acrylamide and 80 parts methylmethacrylate, with an active chlorine content of 7.7%, were converted to the polymeric isocyanate in toluene, with an addition of 5 g of triethylamine.

4.8 g polyisocyanate free from alkali and urea groups, with an NCO content of 4.7% were isolated.

Example 6

10 g of polymeric N-halogen amide of the composition as given in Example 3 were suspended in 50 ml of toluene and a solution of 3 g of trimethyl amine in 50 ml toluene added thereto. The mixture was quickly heated to reflux temperature (110° C.). During heating, excess trimethylamine escaped in gaseous form. Boiling was maintained for 1 hour, followed by cooling, removal of trimethylamine hydrochloride by suction filtration and concentration of the filtrate in a vacuum. The resulting residue was 9.3 g of resin free from alkali and urea groups, with an NCO content of 4.5%.

Example 7

10 g of polymeric, crosslinked N-halogen amide, prepared by chlorinating a polymethacrylamide crosslinked with 5% divinyl benzene and with an active chlorine content of 17%, were suspended in 100 ml of toluene and, after addition of 20 g of triethylamine, treated for 30 minutes at 110° C. Cooling was followed by suction filtration and washing of the residue with chloroform to remove the triethylamine hydrochloride. 7.5 of a white powder free from alkali and urea groups, and with an NCO content of 9.8% remained.

Example 8

A mixture of 10 g of polymeric, crosslinked N-halogen amide of the composition as given in Example 7, 26 g of tripropyl amine and 100 ml of chlorobenzene was heated to 130° C. for 10 minutes. This was followed by suction filtering, washing with chlorobenzene and drying of the residue. 7.7 g of polymeric, crosslinked isocyanate free from alkali and urea groups, with an NCO content of 9.6%, were obtained.

Examples 9–15

Following the process described in Example 1, polyfunctional isocyanates free from alkali and urea groups, with an isocyanate content in a range from 2.8 to 4.8% by weight were prepared from methacrylamide, methylmethacrylate and, as the case may be, butyl acrylate, butylmethacrylate, methyl acrylate, or 2-ethylhexyl acrylate. The resulting products were processed into lacquers by reacting them with a polyol. The polyol used was the commercial product "Setalux 1151" of the firm Synthese, Bergen, OP 200 M, Holland. It involves a polyester grafted with hydroxyl acrylates, with a molecular weight of 2150–220, an OH number of 65–71, and an acid number of 3–4.

A 50% by weight solution of the polyfunctional isocyanate was dissolved in toluene and mixed with an equivalent quantity of a 50% by weight solution of the polyol in xylene/butylglycol acetate. If necessary, the mixture was brought to processing viscosity by the addition of more toluene. 0.5% dibutylin dilaurate was used as catalyst. This lacquer preparation was applied to sheets of glass with a lacquer tool or a film pulling spiral. After a 10-minute airing period, the films were baked for 30 minutes. Clear, bright films were obtained in all cases.

The resulting films are characterized by their hardness and the so-called rub test. The pendulum hardness according to Koenig was measured pursuant to DIN 53 157. With the rub test one determines the solubility, or swelling of the film in a solvent, e.g. methylisobutyl ketone. In the test a finger is wetted with the solvent and moved back and forth over the film under pressure. A determination is made of the number of back-and-forth movements of the finger wet with solvent, which are required to bring about signs of film dissolution. Films showing no dissolution after 100 back-and-forth movements are well crosslinked and are considered good. Table 3 lists the polyfunctional isocyanates used, their isocyanate contents, the crosslinking temperature, the pendulum hardness, and the data obtained in the rub test.

TABLE 3

| Example No. | Polymer, % by weight of the monomers+ | NCO content % by weight | Crosslinking Temperature °C. | Pendulum Hardness (sec) | Rub Test |
|---|---|---|---|---|---|
| 9 | 30 MAA 30 MMA 40 BA | 4.8% | 110 | 195 | >100 |

TABLE 3-continued

| Example No. | Polymer, % by weight of the monomers+ | NCO content % by weight | Crosslinking Temperature °C. | Pendulum Hardness (sec) | Rub Test |
|---|---|---|---|---|---|
| 10 | 20 MAA 40 MMA 40 BA | 3.8% | 120 | 145 | >100 |
| 11 | 20 MAA 40 MMA 40 BA | 4.5% | 100 | 170 | >100 |
| 12 | 20 MAA 40 MMA 40 BMA | 2.8% | 80 | 140 | >100 |
| 13 | 20 MAA 40 MMA 40 MA | 3.6% | 100 | 155 | >100 |
| 14 | 20 MAA 80 MMA | 3.5% | 110 | 180 | >100 |
| 15 | 20 MAA 80 MMA | 3.3% | 110 | 180 | >100 |

+MAA = Methacrylamide
BA = Butylacrylate
MA = Methacrylate
MMA = Methylmethacrylate
BMA = Butylmethacrylate
EHA = 2-Ethylhexylacrylate

Examples 16 and 17 (Comparative Examples)

A polyfunctional isocyanate pursuant to the invention, free from alkali and urea groups, and the product obtained according to Example 20 of U.S. Pat. No. 3,929,744 ("Batch C"), each made from 15% by weight of methylacrylamide and 85% by weight butyl methacrylate, were, after four weeks, crosslinked with the polyol "Setalux 1151" at different baking temperatures, in the manner described for Examples 9–15.

The polyisocyanate pursuant to the invention was a brownish, clear, viscous resin with an isocyanate content of 2.1% by weight, that was unchanged after the four weeks. The product obtained according to the process of the U.S. patent was a brownish, turbid, viscous mass with an original isocyanate content of 2.6% by weight. After the four weeks, the isocyanate content had declined to 2.0% by weight.

The results obtained are compiled in Table 4, which clearly shows the superiority of the products pursuant to the invention and of the coating composition obtainable therefrom.

TABLE 4

| Baking temperatures °C. | Example 16 | | | Example 17 | | |
|---|---|---|---|---|---|---|
| | Rub Test | Hardness | Remark | Rub Test | Hardness | Remark |
| 80 | | | | <20 | 16 | film turbid |
| 100 | | | | ~25 | 25 | turbid |
| 120 | ~25 | 62 | clear | 25–30 | 36 | turbid |
| 130 | 50 | 120 | clear | | | |
| 140 | | | | 25–30 | 48 | slightly turbid |
| 150 | 90 | 135 | clear | ~30 | 57 | slightly turbid |

Example 18

A 50% by weight solution of a polymeric isocyanate prepared from methyl methacrylate, butyl acrylate and methacrylamide (50:40:10), with an isocyanate content of 3.1% by weight, was mixed with equivalent quantities of hexamethylene diamine. Crosslinking started immediately.

Example 19

A polyisocyanate with an isocyanate content of 3.1% by weight, obtained pursuant to Example 1, was crosslinked with a blocked amine. Schiff's base (M,N'-dicyclohexylidene-1,6-hexamethylene diamine) obtained from hexamethylene diamine and cyclohexanone with the exclusion of atmospheric moisture was used as the blocked amine. 50% by weight solutions of the polyisocyanate and of the blocked amine in toluene were mixed with one another. The resulting stable solution was spread on a sheet of glass. The Schiff's base was hydrolized by atmospheric moisture, the amine reacted with the polyisocyanate, and a clear film was obtained.

What is claimed is:

1. A polyfunctional isocyanate which is an acrylamide or metharylamide homopolymer or interpolymer having 20 to 100% of its secondary α and tertiary α carbon atom amide groups converted to isocyanate groups, said polyfunctional isocyanate being free of alkali and urea groups.

2. The polyfunctional isocyanate of claim 1, wherein the interpolymers are formed from methacrylamide and acrylamide, or from methacrylamide or acrylamide and styrene, methylstyrene, dimethylstyrene, chlorostyrene and/or an alkyl acrylate.

3. The polyfunctional isocyanate of claim 2, wherein the alkyl acrylate is methyl acrylate, methyl methacrylate, ethyl acrylate, ethylmethyl acrylate, butyl acrylate, butyl methacrylate, hexyl acrylate, hexyl methacrylate, decyl acrylate, decyl methacrylate, dodecyl acrylate or dodecyl methacrylate.

4. The polyfunctional isocyanate of claim 1, 2 or 3, which are crosslinked with divinyl benzene or divinyl ether.

5. A process for the preparation of polyfunctional isocyanates which comprises reacting an N-chloramide group containing derivative of an acrylamide or methacrylamide homopolymer or interpolymer with a tertiary amine having a $pK_a$ value of more than 7, in the presence of an inert solvent, at a temperature of from about 20° C. to about 180° C.

6. The process of claim 5, wherein the N-chloramide derivative is an interpolymer of methacrylamide and acrylamide, or of methacrylamide or acrylamide and styrene, methylstyrene, dimethylstyrene, chlorostyrene and/or an alkyl acrylate.

7. The process of claim 6, wherein the alkyl acrylate is methyl acrylate, methyl methacrylate, ethyl acrylate, ethylmethyl acrylate, butyl acrylate, butyl methacrylate, hexyl acrylate, hexyl methacrylate, decyl acrylate, decyl methacrylate, dodecyl acrylate or dodecyl methacrylate.

8. The process of claim 5 wherein the N-chloramide derivative is crosslinked by means of divinyl benzene or divinyl ether.

9. The process as in claim 5, 6, 7 or 8 wherein the inert solvent is selected from the group of aliphatic, cycloaliphatic and aromatic hydrocarbons, aliphatic, cycloaliphatic and aromatic halohydrocarbons, carboxylic esters and ethers.

10. The process of claim 5, 6, 7 or 8 wherein the tertiary amine is trimethylamine, triethylamine, tri-n-propylamine, tri-n-butylamine, or 2.4.6-trimethylpyridine.

11. The process of claim 5, 6, 7 or 8, characterized by the fact that the quantity of tertiary amine is 1 to 4 equivalents, based on the N-chloramide group content of the derivative.

12. The process of claim 5, 6, 7 or 8 wherein the reaction takes place at temperatures from 65 to 135° C.

13. In a curable coating composition comprising an active hydrogen containing compound reactive with a polyisocyante to form a cured composition and a polyisocyanate, the improvement which comprises employing the polyisocyanate of claim 1, 2, or 3 in said composition.

14. The polyfunctional isocyanate of claim 1, 2, or 3 wherein the interpolymers contain 5 to 100 mol % of acrylamide or methacrylamide.

15. The polyfunctional isocyanate of claim 4 which is crosslinked with 1 to 110 mol % of the divinyl compound.

* * * * *